United States Patent
Stifelman et al.

(10) Patent No.: US 9,542,949 B2
(45) Date of Patent: *Jan. 10, 2017

(54) SATISFYING SPECIFIED INTENT(S) BASED ON MULTIMODAL REQUEST(S)

(71) Applicant: Microsoft Technology Licensing, LLC, Redmond, WA (US)

(72) Inventors: Lisa J. Stifelman, Palo Alto, CA (US); Anne K. Sullivan, San Francisco, CA (US); Adam D. Elman, Sunnyvale, CA (US); Larry Paul Heck, Los Altos, CA (US); Stephanos Tryphonas, San Francisco, CA (US); Kamran Rajabi Zargahi, San Francisco, CA (US); Ken H. Thai, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 70 days.

This patent is subject to a terminal disclaimer.

(21) Appl. No.: 14/337,175

(22) Filed: Jul. 21, 2014

(65) Prior Publication Data

US 2014/0330570 A1 Nov. 6, 2014

Related U.S. Application Data

(63) Continuation of application No. 13/327,339, filed on Dec. 15, 2011, now Pat. No. 8,788,269.

(51) Int. Cl.
*G10L 17/22* (2013.01)
*G06F 3/16* (2006.01)
(Continued)

(52) U.S. Cl.
CPC ............ *G10L 17/22* (2013.01); *G06F 3/0482* (2013.01); *G06F 3/167* (2013.01); *G10L 15/18* (2013.01); *G10L 2015/223* (2013.01)

(58) Field of Classification Search
CPC ................................. G10L 17/22; G06F 3/167
(Continued)

(56) References Cited

U.S. PATENT DOCUMENTS 5,819,225 A 10/1998 Eastwood et al.
7,363,029 B2 4/2008 Othmer
(Continued)

FOREIGN PATENT DOCUMENTS

WO WO 2013085528 6/2013

OTHER PUBLICATIONS

"Non-Final Office Action Issued in U.S. Appl. No. 13/327,339", Mailed Date: Sep. 6, 2013, filed Dec. 15, 2011, 8 Pages.
(Continued)

*Primary Examiner* — Susan McFadden
(74) *Attorney, Agent, or Firm* — Steven Spellman; Tom Wong; Micky Minhas

(57) ABSTRACT

Techniques are described herein that are capable of satisfying specified intent(s) based on multimodal request(s). A multimodal request is a request that includes at least one request of a first type and at least one request of a second type that is different from the first type. Example types of request include but are not limited to a speech request, a text command, a tactile command, and a visual command. A determination is made that one or more entities in visual content are selected in accordance with an explicit scoping command from a user. In response, speech understanding functionality is automatically activated, and audio signals are automatically monitored for speech requests from the user to be processed using the speech understanding functionality.

20 Claims, 6 Drawing Sheets

(51) Int. Cl.
  *G06F 3/0482* (2013.01)
  *G10L 15/18* (2013.01)
  *G10L 15/22* (2006.01)

(58) Field of Classification Search
  USPC .................................................. 704/270
  See application file for complete search history.

(56) References Cited

U.S. PATENT DOCUMENTS

| | | | |
|---|---|---|---|
| 7,552,054 | B1 | 6/2009 | Stifelman et al. |
| 7,685,252 | B1 | 3/2010 | Maes et al. |
| 7,941,481 | B1 | 5/2011 | Partovi et al. |
| 8,204,995 | B2 | 6/2012 | Sathish |
| 8,473,622 | B2 | 6/2013 | Sathish |
| 8,769,009 | B2 * | 7/2014 | Maskey ............. G06Q 10/10 709/204 |
| 8,788,269 | B2 | 7/2014 | Stifelman et al. |
| 2003/0149803 | A1 | 8/2003 | Wilson |
| 2003/0233237 | A1 | 12/2003 | Garside et al. |
| 2004/0236574 | A1 | 11/2004 | Ativanichayaphong et al. |
| 2007/0124507 | A1 | 5/2007 | Gurram |
| 2008/0147406 | A1 | 6/2008 | Da Palma et al. |
| 2008/0228494 | A1 | 9/2008 | Cross |
| 2009/0030800 | A1 * | 1/2009 | Grois ............... G06F 17/30864 705/14.52 |
| 2009/0170561 | A1 | 7/2009 | Chou |
| 2009/0187846 | A1 | 7/2009 | Paasovaara |
| 2009/0216531 | A1 | 8/2009 | Yanagihara |
| 2010/0031143 | A1 | 2/2010 | Rao et al. |
| 2010/0281435 | A1 | 11/2010 | Bangalore et al. |
| 2011/0115702 | A1 * | 5/2011 | Seaberg ............... G06F 3/017 345/156 |
| 2011/0161080 | A1 | 6/2011 | Ballinger et al. |
| 2011/0246944 | A1 | 10/2011 | Byrne et al. |
| 2012/0022874 | A1 | 1/2012 | Lloyd et al. |
| 2013/0207898 | A1 | 8/2013 | Sullivan et al. |
| 2013/0283195 | A1 | 10/2013 | Bilgen |

OTHER PUBLICATIONS

"Notice of Allowance Issued in U.S. Appl. No. 13/327,339", Mailed Date: Mar. 10, 2014, filed Dec. 15, 2011, 7 Pages.

Paek, et al., "Search Vox: Leveraging Multimodal Refinement and Partial Knowledge for Mobile Voice Search", In Proceedings of the 21st Annual ACM Symposium on User Interface Software and Technology, Oct. 19, 2008, pp. 141-149.

Sharma, et al., "Speech-Gesture Driven Multimodal Interfaces for Crisis Management", In Proceedings of the IEEE, vol. 91, Issue 9, Sep. 2003, pp. 1327-1354.

"Speak4it", Retrieved on: Nov. 15, 2011, Available at: http://www.speak4it.com/news, 4 pages.

Bolt, Richard A., ""Put-That-There": Voice and Gesture at the Graphics Interface", In Proceedings of the 7th Annual Conference on Computer Graphics and Interactive Techniques, Jul. 1980, pp. 262-270.

U.S. Appl. No. 13/372,850, Amendment and Response, filed Mar. 12, 2015, 13 pgs.

U.S. Appl. No. 13/372,850, Office Action mailed Jul. 6, 2015, 22 pgs.

U.S. Appl. No. 13/372,850, Amendment and, filed Sep. 16, 2015, 18 pgs.

U.S. Appl. No. 13/372,850, Office Action mailed Oct. 7, 2015, 24 pgs.

U.S. Appl. No. 13/372,850, Amendment and Response, filed Jan. 7, 2016, 16 pgs.

Harada, et al., paper entitled "Voice Games: Investigation Into the Use of Non-Speech Voice Input for Making Computer Games More Accessible," 18 pages, Published Sep. 5, 2011.

U.S. Appl. No. 13/372,339, Amendment and Response, filed Jan. 6, 2014, 30 pgs.

U.S. Appl. No. 13/372,850, Amendment and Response, filed Nov. 12, 2014, 13 pgs.

U.S. Appl. No. 13/372,850, Amendment and Response, filed Jul. 28, 2014, 14 pgs.

U.S. Appl. No. 13/372,850, Office Action mailed Dec. 12, 2014, 22 pgs.

U.S. Appl. No. 13/372,850, Office Action mailed Mar. 27, 2014, 21 pgs.

U.S. Appl. No. 13/372,850, Office Action mailed Aug. 12, 2014, 20 pgs.

U.S. Appl. No. 13/372,850, Office Action mailed May 11, 2016, 24 pgs.

\* cited by examiner

SATISFYING SPECIFIED INTENT(S) BASED ON MULTIMODAL REQUEST(S)

CROSS-REFERENCE TO RELATED APPLICATION(S)

This application is a continuation of U.S. patent application Ser. No. 13/327,339, filed Dec. 15, 2011, which issued as U.S. Pat. No. 8,788,269 on Jul. 22, 2014, the entirety of which is incorporated by reference herein.

BACKGROUND

Task completion on conventional processing systems (e.g., tablets, mobile phones, and desktop computers) typically is performed in a step-by-step fashion by clicking through successive options using a windows-based interface. For instance, if a user wants to make a reservation at a restaurant, the user traditionally performs a text-based search to find a web site that corresponds to the restaurant and then uses a pointing device (e.g., mouse or finger) to click through options (e.g., number of people, time, etc.) either on the web site or using a separate application.

Some conventional processing systems are configured to execute spoken natural language applications, which are capable of understanding spoken natural language of users. However, such applications traditionally operate independently from other applications that may be used to complete a task. Accordingly, a spoken natural language application often may not be capable of performing a task unless the user is able to recite a relatively substantial amount of detail regarding the task. Otherwise, the user may be better served to select another application with which to browse through options in order to complete the task. Moreover, a user typically performs extra steps (e.g., pushing an on/off button) to launch a spoken natural language application, which may distract the user from the task.

SUMMARY

Various approaches are described herein for, among other things, satisfying specified intent(s) based on multimodal request(s). A multimodal request is a request that includes at least one request of a first type and at least one request of a second type that is different from the first type. The terms "request" and "command" are used interchangeably herein to have a common meaning. A request (i.e., command) may be in the form of an inquiry, a statement, etc. Example types of request include but are not limited to a speech request, a text command, a tactile command, and a visual command.

A user may provide request(s) to a processing system to satisfy an intent of the user. The processing system may perform task(s) in response to such request(s). The request(s) and resulting task(s), if any, are referred to as an interaction between the user and the processing system. A scope of the interaction may be established and/or refined based on subject matter associated with one or more of the request(s). A request that establishes or refines a scope of an interaction is referred to as a scoping command. A scoping command may be implicit or explicit. An implicit scoping command implicitly indicates a scope of an interaction. For example, a request merely to turn on or off speech understanding functionality of a processing system is an implicit scoping command because, although such a request may indicate that a subsequent request is to be provided for establishing or refining a scope of an interaction, the implicit scoping command itself does not establish or refine the scope of the interaction. An explicit scoping command, on the other hand, explicitly indicates a scope of an interaction. For example, a request in accordance with which one or more entities displayed in visual content are selected is an explicit scoping command because the request identifies the one or more entities with respect to which the scope of the interaction is established or refined.

A method is described in which a determination is made that one or more entities in visual content, which is displayed on a display of a processing system, are selected in accordance with an explicit scoping command from a user. The explicit scoping command identifies the one or more entities in the visual content to explicitly indicate a scope of an interaction between the user and the processing system. Speech understanding functionality of the processing system is automatically activated in response to determining that the one or more entities are selected. The speech understanding functionality enables the processing system to understand natural language requests. Audio signals that are received via an audio interface of the processing system are automatically monitored for speech requests from the user to be processed using the speech understanding functionality in response to determining that the one or more entities are selected.

A processing system is described that includes a display, determination logic, speech understanding logic, activation logic, an audio interface, and monitoring logic. The display is configured to display visual content. The determination logic is configured to determine whether one or more entities in the visual content are selected in accordance with an explicit scoping command from a user. The explicit scoping command identifies the one or more entities in the visual content to explicitly indicate a scope of an interaction between the user and the processing system. The speech understanding logic is configured to understand natural language requests. The activation logic is configured to automatically activate the speech understanding logic in response to a determination that the one or more entities are selected in accordance with the explicit scoping command. The audio interface is configured to receive audio signals. The monitoring logic is configured to automatically monitor the audio signals for speech requests from the user in response to the determination that the one or more entities are selected. The monitoring logic is further configured to provide the speech requests to the speech understanding logic for processing.

A computer program product is described that includes a computer-readable medium having computer program logic recorded thereon for enabling a processor-based system to satisfy specified intents based on multimodal requests. The computer program product includes first, second, and third program logic modules. The first program logic module is for enabling the processor-based system to determine whether one or more entities in visual content displayed on a display of the processor-based system are selected in accordance with an explicit scoping command from a user. The explicit scoping command identifies the one or more entities in the visual content to explicitly indicate a scope of an interaction between the user and the processor-based system. The second program logic module is for enabling the processor-based system to automatically activate speech understanding functionality of the processor-based system in response to a determination that the one or more entities are selected. The speech understanding functionality enables the processor-based system to understand natural language requests. The third program logic module is for enabling the processor-based system to automatically monitor audio signals received via an audio interface of the processor-based system for speech requests from the user to be processed using the speech understanding functionality in response to the determination that the one or more entities are selected.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
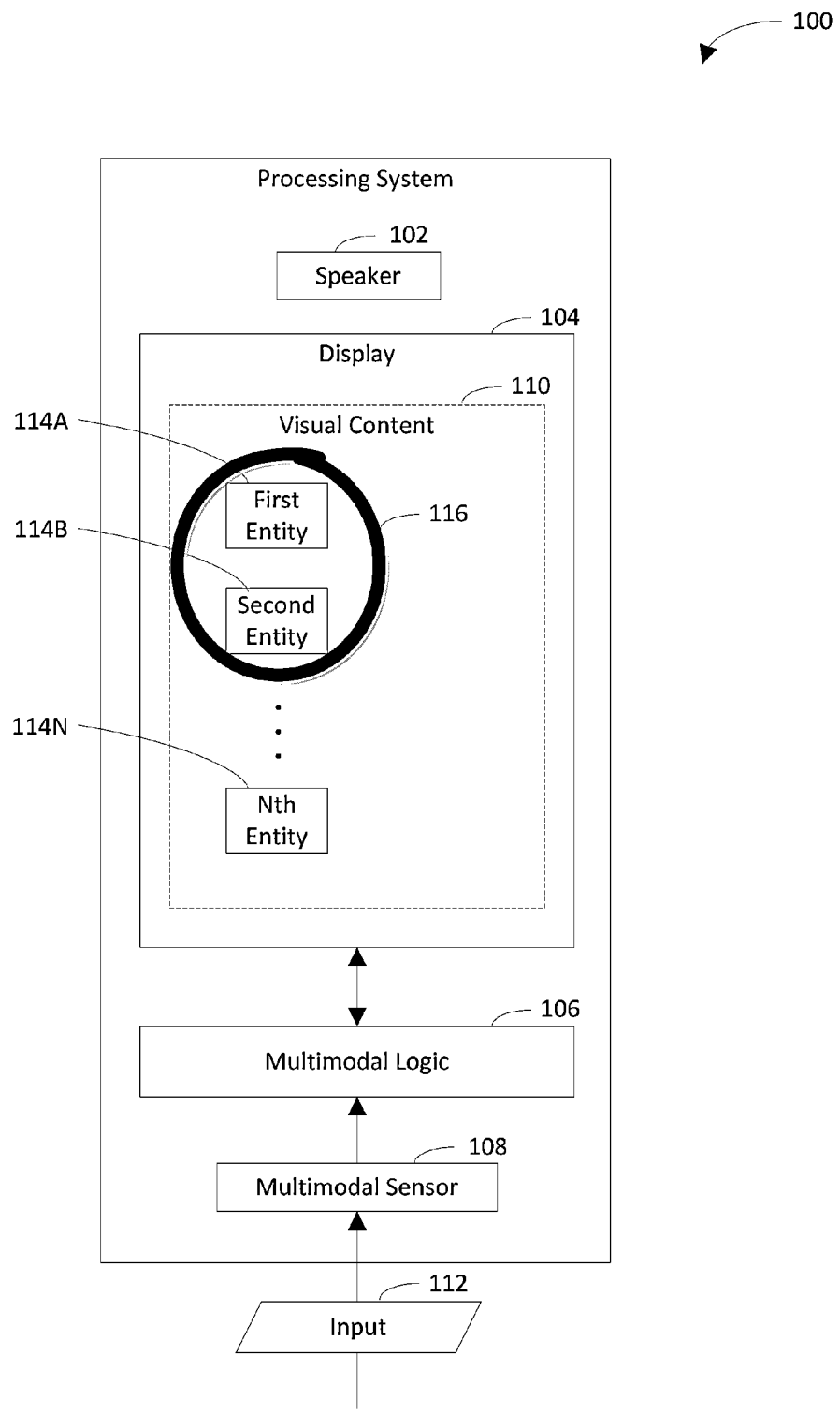
FIG. 1 is a block diagram of an example processing system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of satisfying specified intent(s) based on multimodal request(s). A multimodal request is a request that includes at least one request of a first type and at least one request of a second type that is different from the first type. The terms "request" and "command" are used interchangeably herein to have a common meaning. A request (i.e., command) may be in the form of an inquiry, a statement, etc. Example types of request include but are not limited to a speech request, a text command, a tactile command, and a visual command.

A user may provide request(s) to a processing system to satisfy an intent of the user. The processing system may perform task(s) in response to such request(s). The request(s) and resulting task(s), if any, are referred to as an interaction between the user and the processing system. A scope of the interaction may be established and/or refined based on subject matter associated with one or more of the request(s). A request that establishes or refines a scope of an interaction is referred to as a scoping command. A scoping command may be implicit or explicit. An implicit scoping command implicitly indicates a scope of an interaction. For example, a request merely to turn on or off speech understanding functionality of a processing system is an implicit scoping command because, although such a request may indicate that a subsequent request is to be provided for establishing or refining a scope of an interaction, the implicit scoping command itself does not establish or refine the scope of the interaction. An explicit scoping command, on the other hand, explicitly indicates a scope of an interaction. For example, a request in accordance with which one or more entities displayed in visual content are selected is an explicit scoping command because the request identifies the one or more entities with respect to which the scope of the interaction is established or refined.

Example techniques described herein have a variety of benefits as compared to conventional natural language techniques. For instance, example techniques are capable of combining speech, touch (a.k.a. tactile), and/or gesture commands to provide an overall natural interaction in which the touch and/or gesture command(s) identify at least one entity, and the speech command(s) include verb(s) and/or associated attribute(s) for satisfying specified intent(s) regarding the at least one entity. Examples of a touch command include but are not limited to clicking on the at least one entity, double-clicking on the at least one entity, clicking and holding on the at least one entity, drawing a shape (e.g., a circle or an oval) around the at least one entity with a pointing object (e.g., the user's finger or a stylus), etc. Examples of a gesture command include but are not limited to a hand being waved (perhaps in a specified manner) in front of a camera that is included in a processing system, a facial expression being made, the user pointing at a display of the processing system, the processing system being moved in a specified linear or angular direction, the camera being pointed at a physical object or a scene, etc.

The example techniques may result in quicker completion of tasks, and therefore quicker satisfaction of the corresponding specified intents, as compared to conventional techniques. For instance, the example techniques may automatically access the appropriate user experience applications in order to satisfy the specified intents. Examples of a user experience application include but are not limited to a calendar application, a word processing application, a messaging (e.g., email, short message service (SMS), instant message (IM), etc.) application, a Web browser, a Web search engine, a map application, etc. For instance, a user may hold a juice can to a camera of a processing system and say "Add calories for this" to update a calorie log; the user may point the camera at a scene and say "Send this to Ken" to email an electronic image of the scene to Ken; the user may press or point at a portion of a display of the processing system in which a movie trailer is playing and say "What times is this showing tonight" to obtain a list of showtimes at cinemas near the user's home, etc.

Some example techniques may be capable of providing representations of possible intents to be satisfied with respect to one or more entities that are displayed on a display (e.g., screen). An example interaction in which possible intents are provided for a user is discussed below with reference to FIG. 4.

FIG. 1 is a block diagram of an example processing system 100 in accordance with an embodiment. An example of a processing system is a system that includes at least one processor that is capable of manipulating data in accordance with a set of instructions. For instance, a processing system may be a computer (e.g., a desktop computer, a laptop computer, a tablet computer, etc.), a personal digital assistant, a cellular telephone, a television, a game console (e.g., an Xbox® developed by Microsoft Corporation, a Playstation® developed by Sony Corporation, or a WHO developed by Nintendo), etc.

Generally speaking, processing system 100 operates to satisfy specified intent(s) based on multimodal request(s). Processing system 100 includes a speaker 102, a display 104, multimodal logic 106, and a multimodal sensor 108. Multimodal sensor 108 is a sensor that is capable of detecting multiple types of request that are included in input 112. For instance, multimodal sensor 108 may include an audio interface (e.g., a microphone) for detecting speech requests, a textual interface (e.g., a keyboard, a virtual or physical keypad, etc.) for detecting textual commands, a tactile interface (e.g., piezoelectric sensors) for detecting tactile commands (e.g., an object being touched on display 104), a visual interface (e.g., a camera) for detecting visual commands (e.g., a hand being waved (perhaps in a specified manner) or a facial expression being made), a gyroscope and/or an accelerometer for detecting motion commands from a user (e.g., processing system 100 being moved in a specified linear or angular direction), etc.

Display 104 provides visual content 110 for viewing by a user. Display 104 may receive the visual content 110 from source(s) external to processing system 100, source(s) internal to processing system 100 (e.g., a store), or a combination thereof. The visual content 110 may include documents (e.g., Web pages, images, video files, etc.), output of executables, and/or any other suitable type of visual content. The visual content 110 is shown in FIG. 1 to include a plurality of entities 114A-114N for illustrative purposes and is not intended to be limiting. For instance, the visual content 110 may include a single entity or no entities. First entity 114A and second entity 114B are shown to be selected by the user, as depicted by circle 116, which includes the first and second entities 114A-114B. More particularly, the first and second entities 114A-114B are selected in accordance with an explicit scoping command from the user.

Multimodal logic 106 is configured to satisfy specified intent(s) based on request(s) that are included in input 112. Multimodal logic 106 determines when one or more of the entities 114A-114N are selected in accordance with an explicit scoping command. In this example, multimodal logic 106 determines that the first and second entities 114A-114B are selected in accordance with an explicit scoping command. Upon making this determination, multimodal logic 106 automatically activates speech understanding functionality, which is implemented in multimodal logic 106. Multimodal logic 106 automatically monitors audio signals that are received via multimodal sensor 108 for speech requests from the user. Multimodal logic 106 may automatically monitor tactile, visual, and/or textual information received via multimodal sensor 108 for respective tactile, visual, and/or textual commands from the user, as well, though the scope of the example embodiments is not limited in this respect. Upon detecting a speech request or a textual command from the user, multimodal logic 106 processes the speech request or the textual command using the speech understanding functionality.

Multimodal logic 106 is further configured to determine possible intents that may be satisfied with respect to selected entities (i.e., the first and second entities 114A-114B in this example). Multimodal logic 106 is capable of providing the possible intents to the user via an interface, such as speaker 102 and/or display 104. An example technique for providing possible intents to a user is discussed in further detail below with reference to FIG. 4.

Multimodal logic 106 may be configured to maintain an understanding of an intent of the user. Accordingly, multimodal logic 106 may adapt the understanding of the intent based on any of a variety of factors, including but not limited to a scope that is associated with selected entities (e.g., the first and second entities 114A-114B in this example). Adapting the understanding of the intent may be carried out by establishing the understanding and/or refining the understanding. For instance, if the multimodal logic 106 has no understanding of the intent, multimodal logic 106 may establish (e.g., initiate or create) the understanding. If the understanding exists, multimodal logic 106 may refine the existing understanding.

Speaker 102 is configured to provide audio information to the user. Such audio information may include audio representations of possible intents of the user, audio content that is associated with the visual content 110, etc.

Example techniques for satisfying specified intent(s) based on multimodal request(s) are discussed in further detail below with reference to FIGS. 2-4.

Multimodal logic 106 may be implemented in various ways to satisfy specified intent(s) based on multimodal request(s), including being implemented in hardware, software, firmware, or any combination thereof. For example, multimodal logic 106 may be implemented as computer program code configured to be executed in one or more processors. In another example, multimodal logic 106 may be implemented as hardware logic/electrical circuitry. In an embodiment, multimodal logic 106 may be implemented in a system-on-chip (SoC). Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 2A:
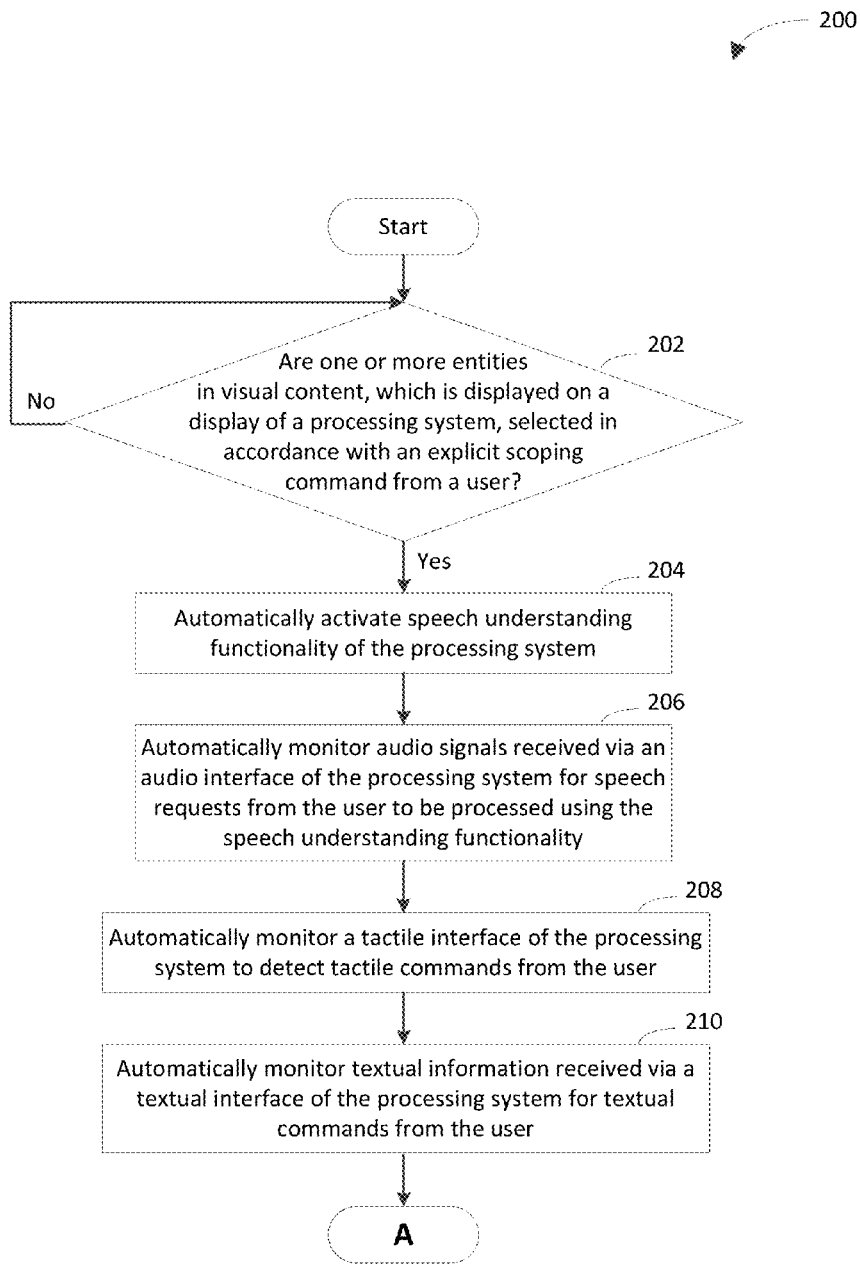
FIGS. 2A and 2B depict respective portions of a flowchart of an example method for satisfying specified intent(s) based on multimodal request(s) in accordance with an embodiment.
Figure 2B:
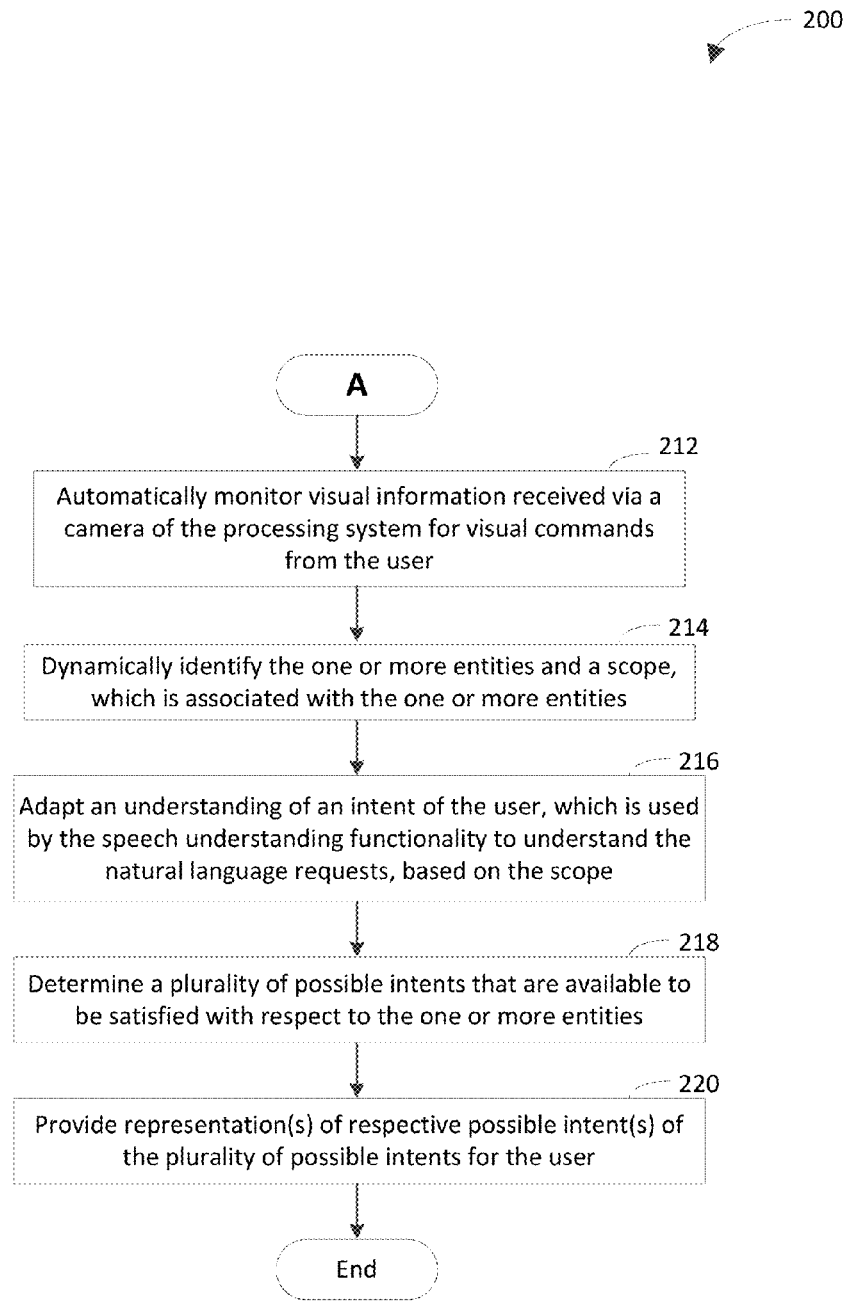

FIGS. 2A and 2B depict respective portions of a flowchart 200 of an example method for satisfying specified intent(s) based on multimodal request(s) in accordance with an embodiment. Flowchart 200 may be performed by processing system 100 shown in FIG. 1, for example. For illustrative purposes, flowchart 200 is described with respect to a processing system 300 shown in FIG. 3, which is an example of processing system 100, according to an embodiment. As shown in FIG. 3, processing system 300 includes a camera 302, a first audio interface 328, a second audio interface 304, a display 306, multimodal logic 308, and a textual interface 330. Display 306 is shown to include a tactile interface 310 for illustrative purposes, though tactile interface 310 need not necessarily be included in display 306. Multimodal logic 308 includes determination logic 312, speech understanding logic 314, activation logic 316, monitoring logic 318, identification logic 320, intent logic 322, availability logic 324, and response logic 326. Further structural and operational embodiments will be apparent to persons skilled in the relevant art(s) based on the discussion regarding flowchart 200.

As shown in FIG. 2A, the method of flowchart 200 begins at step 202. In step 202, a determination is made whether one or more entities in visual content, which is displayed on a display of a processing system, are selected in accordance with an explicit scoping command from a user. The explicit scoping command identifies the one or more entities in the visual content to explicitly indicate a scope of an interaction between the user and the processing system. If one or more entities in the visual content are selected in accordance with an explicit scoping command from the user, flow continues to step 204. Otherwise, flow returns to step 202. In an example implementation, display 306 displays the one or more entities in visual content 362. In accordance with this implementation, determination logic 312 determines whether the one or more entities in the visual content 362 are selected in accordance with an explicit scoping command from the user. For instance, determination logic 312 may generate explicit selection indicator 370 and/or entity information 368 in response to determining that the one or more entities in the visual content 362 are selected. The entity information 368 includes information regarding the one or more entities (e.g., attributes of the one or more entities) to facilitate identification of the one or more entities. The explicit selection indicator 370 specifies that the one or more entities are selected in accordance with an explicit scoping command.

At step 204, speech understanding functionality of the processing system is automatically activated. The speech understanding functionality enables the processing system to understand natural language requests. For instance, a natural language request may be a spoken natural language request or a written natural language request. In an example implementation, speech understanding logic 314 is configured to perform the speech understanding functionality of processing system 300. In accordance with this implementation, activation logic 316 automatically activates the speech understanding functionality. For example, activation logic 316 may automatically generate activation instruction 356 in response to receipt of the explicit selection indicator 370. In accordance with this example, the activation instruction 356 may cause the speech understanding functionality of speech understanding logic 314 to be automatically activated.

At step 206, audio signals received via an audio interface of the processing system are automatically monitored for speech requests from the user to be processed using the speech understanding functionality. In an example implementation, first audio interface 328 receives audio signals 378. In accordance with this implementation, monitoring logic 318 automatically monitors the audio signals 378 for speech request(s) 342, which are to be processed using the speech understanding functionality of speech understanding logic 314.

At step 208, a tactile interface of the processing system is automatically monitored to detect tactile commands from the user. In an example implementation, tactile interface 310 provides tactile information 338 in response to receiving tactile input 336. For example, the tactile input 336 may include contact of one or more objects with the tactile interface 310. In another example, the tactile input 336 may be initiated in response to contact of one or more objects with display 306, which includes tactile interface 310. In accordance with this implementation, monitoring logic 318 automatically monitors the tactile information 338 received from tactile interface 310 to detect tactile command(s) 344.

At step 210, textual information received via a textual interface of the processing system is monitored for textual commands from the user. In an example implementation, textual interface 330 generates textual information 354 based on textual input 352. In accordance with this implementation, textual interface 330 generates textual information 354 in response to receiving textual input 352. In further accordance with this implementation, monitoring logic 318 automatically monitors the textual information 354 for textual command(s) 332. Upon completion of step 210, flow continues to step 212, which is shown in FIG. 2B.

At step 212, visual information received via a camera of the processing system is automatically monitored for visual commands from the user. In an example implementation, camera 302 receives visual information 334. In accordance with this implementation, monitoring logic 318 automatically monitors the visual information 334 for visual command(s) 340.

At step 214, the one or more entities and a scope, which is associated with the one or more entities, are dynamically identified. In an example implementation, identification logic 320 dynamically identifies the one or more entities and the scope. For instance, identification logic 320 may dynamically identify the one or more entities and the scope in response to receiving explicit selection indicator 370. Identification logic 320 may dynamically identify the one or more entities and the scope based on the entity information 368 received from determination logic 312. Identification logic 320 may generate entity identifier 346 and/or scope identifier 358 in response to dynamically identifying the one or more entities and the scope. The entity identifier 346 specifies an identity of each of the one or more entities. The scope identifier 358 specifies the scope.

At step 216, an understanding of an intent of the user, which is used by the speech understanding functionality to understand the natural language requests, is adapted based on the scope. In an example implementation, determination logic 312 adapts an understanding 366 of the intent of the user. In accordance with this implementation, speech understanding logic 314 uses the understanding 366 to understand the natural language requests.

At step 218, a plurality of possible intents that are available to be satisfied with respect to the one or more entities is determined. In an example implementation, availability logic 324 determines possible intents 348, which are available to be satisfied with respect to the one or more entities. For instance, availability logic 324 may determine the possible intents 348 based on entity identifier 346.

At step 220, representation(s) of respective possible intent(s) of the plurality of possible intents are provided for the user. In an example implementation, second audio interface 304 provides audio representation(s) 360 of possible intent(s), which are included in the possible intents 348. In another example implementation, display 306 provides visual representation(s) 364 of possible intent(s), which are included in the possible intents 348. For instance, second audio interface 304 and/or display 306 may provide the audio representation(s) 360 and/or the visual representation(s) 364, respectively, in response to receipt of the possible intents 348 from availability logic 324.

In an example embodiment, step 220 includes suggesting exemplary natural language request(s) for use by the user to request satisfaction of the respective possible intent(s), which are included in the plurality of possible intents. In accordance with this embodiment, speech understanding logic 314 is capable of understanding each of the exemplary natural language request(s) using the speech understanding functionality. Accordingly, each representation may be configured as a respective exemplary natural language request.

In some example embodiments, one or more steps 202, 204, 206, 208, 210, 212, 214, 216, 218, and/or 220 of flowchart 200 may not be performed. Moreover, steps in addition to or in lieu of steps 202, 204, 206, 208, 210, 212, 214, 216, 218, and/or 220 may be performed. For instance, in an example embodiment, step 206 includes receiving a first speech request from the user. The first speech request indicates a specified intent to be satisfied with respect to the one or more entities. For instance, the first speech request may be included in speech request(s) 342, which is received by determination logic 312. Determination logic 312 may determine the specified intent upon receipt of the first speech request. Determination logic 312 may generate an intent indicator 372 to indicate the specified intent and/or to indicate receipt of the first speech request.

In one aspect of this embodiment, flowchart 200 further includes generating a language response for the user based on the first speech request. The language response pertains to satisfaction of the specified intent. For example, the language response may indicate that the specified intent is being satisfied or has been satisfied. In another example, the language response may include a question regarding satisfaction of the specified intent. In accordance with this example, the language response may solicit information from the user to more precisely satisfy the specified intent. For instance, a language response of "Do you want to send that by email or instant message?" may be provided to determine a type of application that is to be used for sending a message. In accordance with this aspect, response logic 326 may generate response(s) 350 based on the request indicator 376. In further accordance with this aspect, second audio interface 304 and/or display 306 may provide the response(s) 350 for perception by the user. For instance, second audio interface 304 may provide an audio representation of the response(s) 350 to be included in audio representation(s) 360. Display 306 may provide a visual representation of the response(s) 350 to be included in visual representation(s) 364.

In another aspect of this embodiment, flowchart 200 further includes satisfying the specified intent with respect to the one or more entities. For instance, intent logic 322 may satisfy the specified intent based on the intent indicator 372. In accordance with this aspect, the understanding of the intent of the user is further adapted based on the specified intent. For instance, intent logic 322 may further adapt the understanding 366 of the intent of the user based on the intent indicator 372.

It will be recognized that processing system 300 may not include one or more of camera 302, first audio interface 328, second audio interface 304, display 306, multimodal logic 308, tactile interface 310, determination logic 312, speech understanding logic 314, activation logic 316, monitoring logic 318, identification logic 320, intent logic 322, availability logic 324, response logic 326, and/or textual interface 330. Furthermore, processing system 300 may include modules in addition to or in lieu of camera 302, first audio interface 328, second audio interface 304, display 306, multimodal logic 308, tactile interface 310, determination logic 312, speech understanding logic 314, activation logic 316, monitoring logic 318, identification logic 320, intent logic 322, availability logic 324, response logic 326, and/or textual interface 330. Moreover, it will be recognized that determination logic 312 and/or intent logic 322 may be incorporated into a spoken language understanding (SLU).

Figure 3:
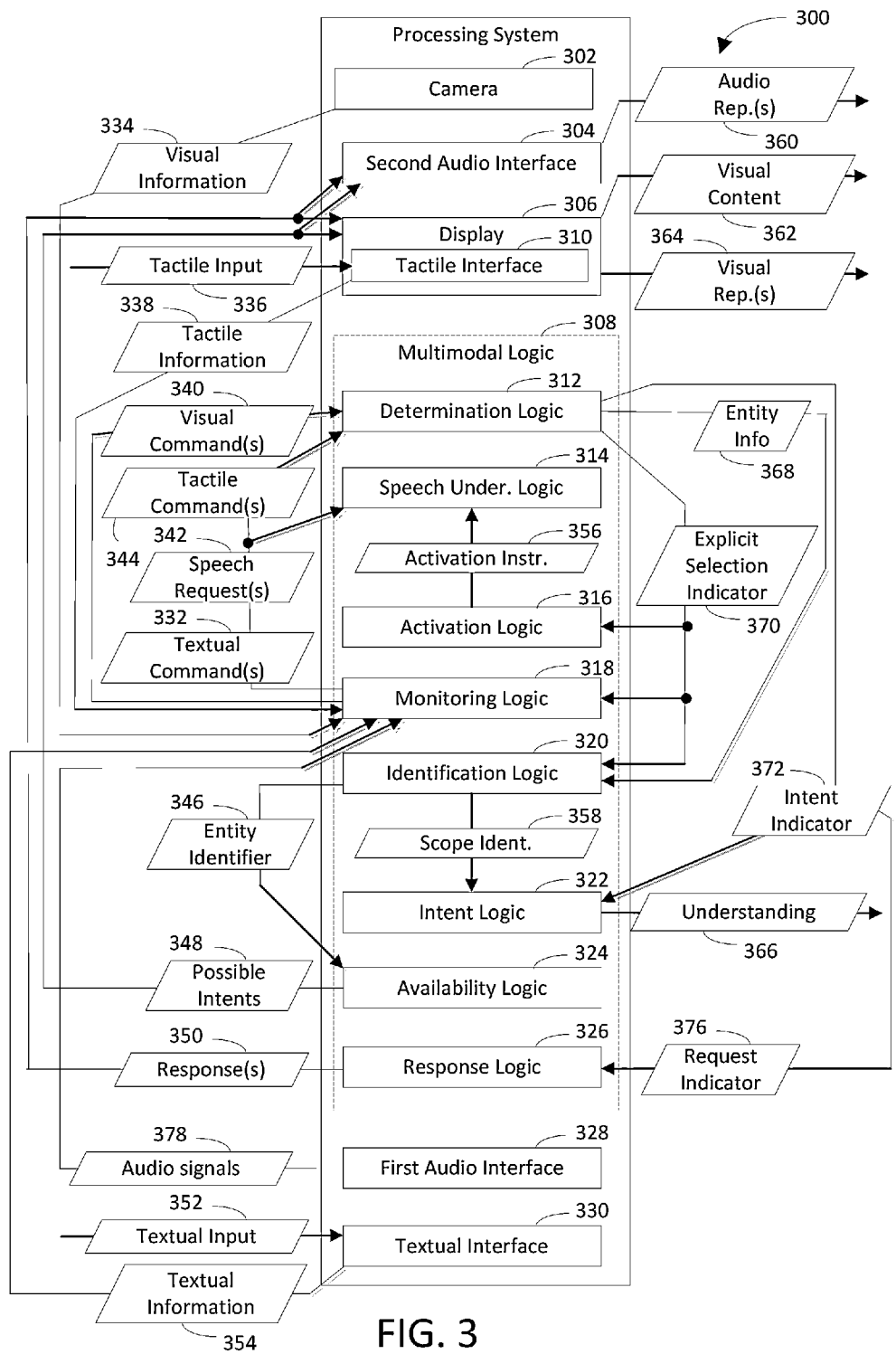
FIG. 3 is a block diagram of an example implementation of a processing system shown in FIG. 1 in accordance with an embodiment.
Figure 4:
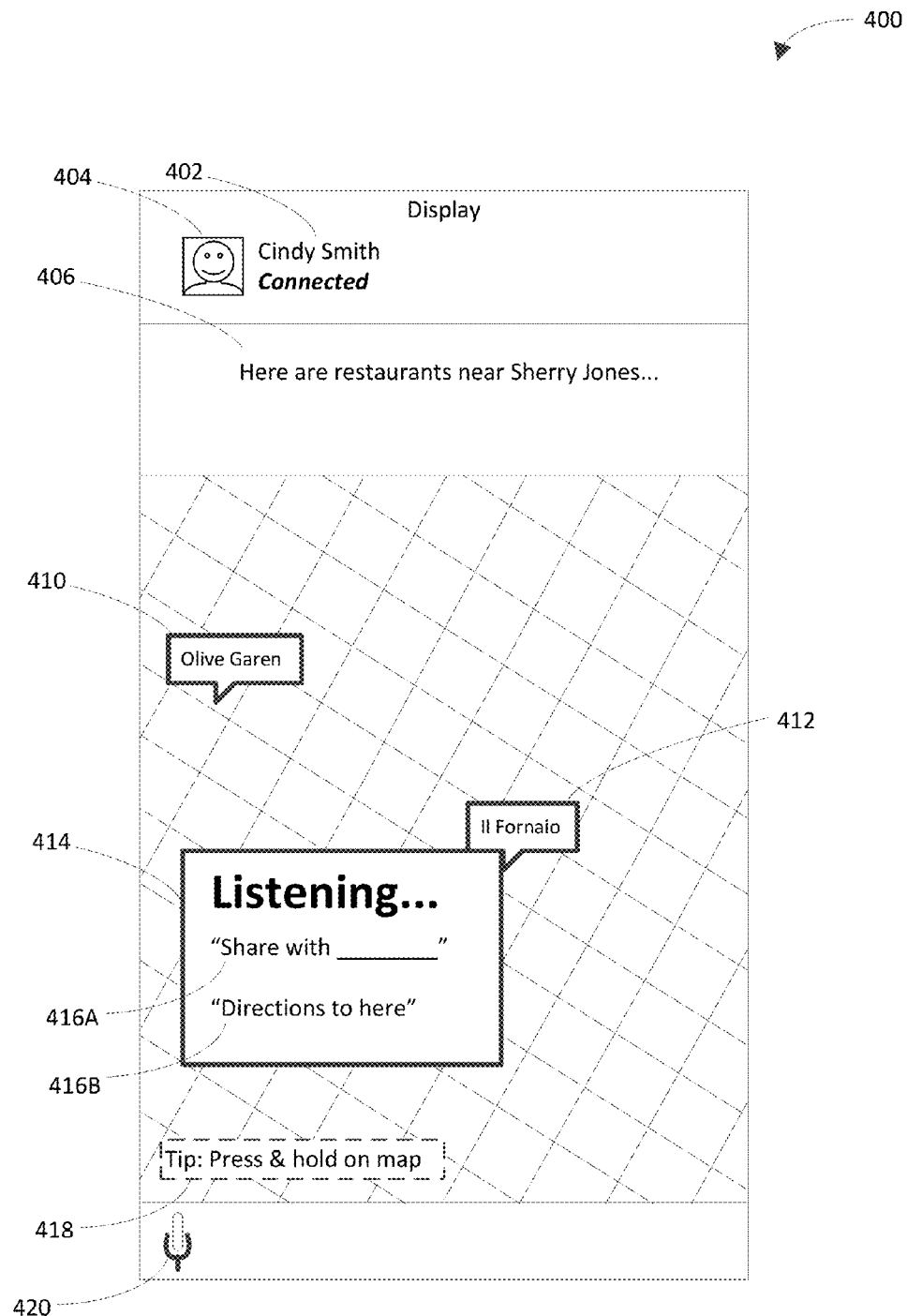
FIG. 4 is an example implementation of a display shown in FIG. 3 in accordance with an embodiment.

FIG. 4 is an example implementation of a display 400 shown in FIG. 3 in accordance with an embodiment. Display 400 will be described with continued reference to an example multimodal request to illustrate one possible interaction of a user with the processing system that includes display 400 in accordance with some of the techniques described herein.

Display 400 shows content 424 which includes a map. A user, "Cindy Smith" as indicated by icon 404 and name indicator 402, has pressed an object on the map, which has caused the processing system that includes display 400 to determine that the object was selected by the user. The processing system consequently automatically activated its speech understanding functionality. Icon 420 serves as a master control for turning on and/or off the speech understanding functionality of the processing device. It will be recognized that icon 420 is not considered to be included in the content 424 because icon 420 does not correspond to an intent of the user. Rather, icon 420 is merely a tool that can be used by the user to access information that corresponds to the intent of the user.

Once the user realized that the speech understanding functionality had been activated, the user provided a speech request, asking for restaurants near her friend Sherry Jones's house. Display 400 shows a response 406 to the user's request, which reads "Here are restaurants near Sherry Jones . . . ". Display 400 also shows icons 410 and 412 overlaid on the map. Icon 410 identifies Olive Garden, and icon 412 identifies Il Fornaio.

Tip 418 suggests that the user press and hold her finger on the map. The user accepts the suggestion, pressing and holding her finger on icon 412. A suggestion window 414 appears adjacent to icon 412 to indicate that the processing system is listening for a speech command from the user. Suggestion window 414 includes two possible intents 416A-416B that may be satisfied with respect to the restaurant Il Fornaio, which is represented by icon 412. A first possible intent 416A reads, "Share with _____". The first possible intent 416A includes a carrier phrase of "Share with" and a slot, which is represented as an underlined blank for illustrative purposes. For instance, the user may say, "Share with John", "I'd like to recommend this restaurant to Lisa", or some other natural language variant of the first possible intent 416A to satisfy a corresponding specified intent.

It will be recognized that a slot in a possible intent is a placeholder that is identified as being replaceable by one or more words that identify an entity, an action, and/or attribute(s) thereof for indicating a specified intent. A carrier phrase in a possible intent includes one or more words that suggest a type of entity and/or action that is to be identified by the one or more words that may replace the corresponding slot. A slot may have any suitable format, such as a blank, an underlined blank (as shown in first possible intent 416), text that is distinguishable from text that is included in the corresponding carrier phrase, etc.

The second possible intent 416B includes the phrase "Directions to here". The second possible intent 416B indicates that the user may obtain directions to Il Fornaio by asking for the directions. Although the second possible intent 416B does not include a slot, it will be recognized that the user need not necessarily use the language recited in the second possible intent 416B. The user may use any suitable language in a request for directions to Il Fornaio. Moreover, the first and second possible intents 416A-416B are provided for illustrative purposes and are not intended to be limiting. For instance, the user may request to make a reservation at Il Fornaio, check the hours of operation, look for another restaurant, change the scope of the interaction to determine which movies are playing at the local cinema, etc.

Multimodal logic 106, multimodal logic 308, tactile interface 310, determination logic 312, speech understanding logic 314, activation logic 316, monitoring logic 318, identification logic 320, intent logic 322, availability logic 324, response logic 326, textual interface 330, and flowchart 200 may be implemented in hardware, software, firmware, or any combination thereof.

For example, multimodal logic 106, multimodal logic 308, tactile interface 310, determination logic 312, speech understanding logic 314, activation logic 316, monitoring logic 318, identification logic 320, intent logic 322, availability logic 324, response logic 326, textual interface 330, and/or flowchart 200 may be implemented as computer program code configured to be executed in one or more processors.

In another example, multimodal logic 106, multimodal logic 308, tactile interface 310, determination logic 312, speech understanding logic 314, activation logic 316, monitoring logic 318, identification logic 320, intent logic 322, availability logic 324, response logic 326, textual interface 330, and/or flowchart 200 may be implemented as hardware logic/electrical circuitry. For instance, in an embodiment, multimodal logic 106, multimodal logic 308, tactile interface 310, determination logic 312, speech understanding logic 314, activation logic 316, monitoring logic 318, identification logic 320, intent logic 322, availability logic 324, response logic 326, textual interface 330, and/or flowchart 200 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 5:
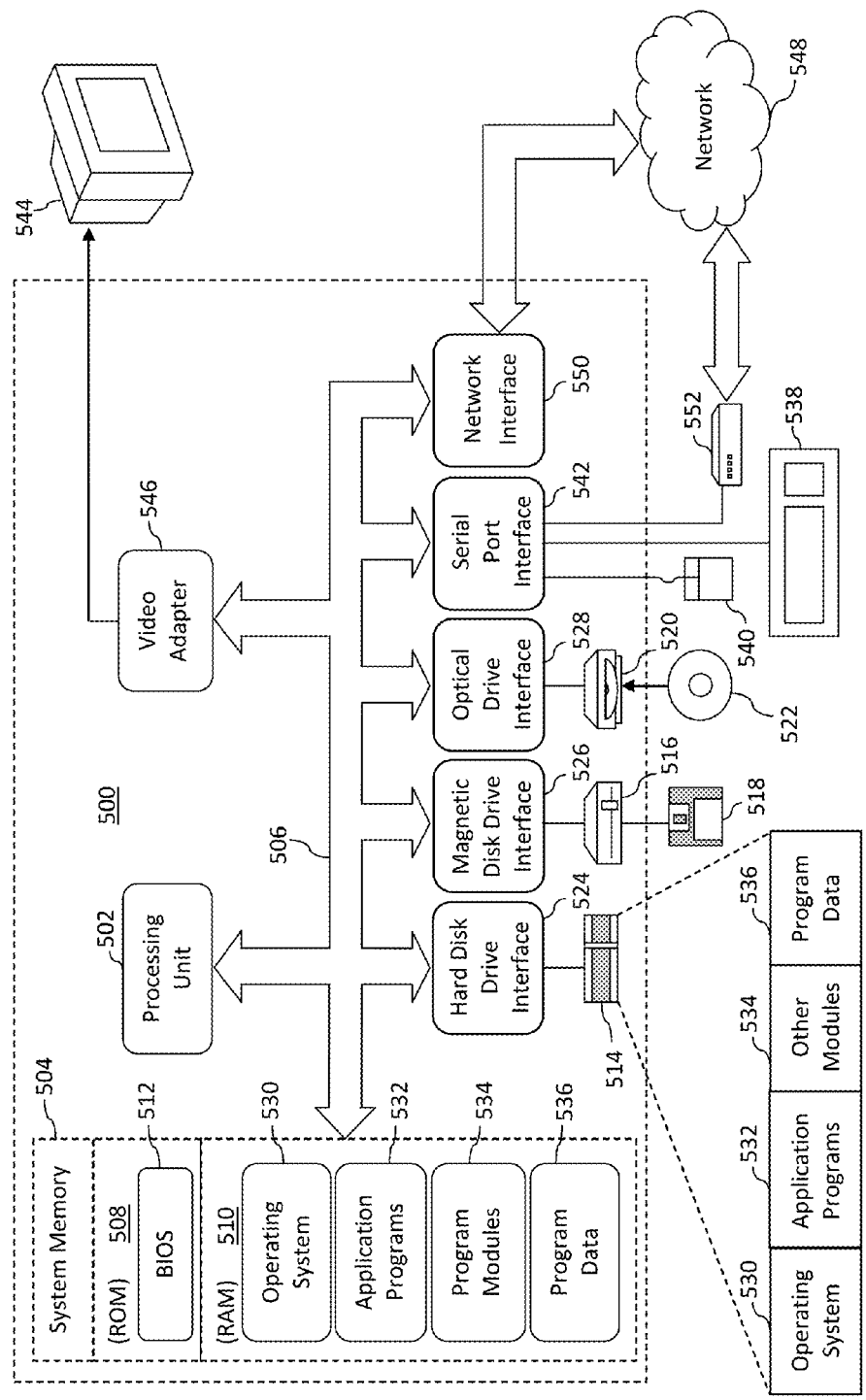
FIG. 5 depicts an example computer in which embodiments may be implemented.

FIG. 5 depicts an example computer 500 in which embodiments may be implemented. Processing system 100 shown in FIG. 1 (or any one or more subcomponents thereof shown in FIGS. 3 and 4) may be implemented using computer 500, including one or more features of computer 500 and/or alternative features. Computer 500 may be a general-purpose computing device in the form of a conventional personal computer, a mobile computer, or a workstation, for example, or computer 500 may be a special purpose computing device. The description of computer 500 provided herein is provided for purposes of illustration, and is not intended to be limiting. Embodiments may be implemented in further types of computer systems, as would be known to persons skilled in the relevant art(s).

As shown in FIG. 5, computer 500 includes a processing unit 502, a system memory 504, and a bus 506 that couples various system components including system memory 504 to processing unit 502. Bus 506 represents one or more of any of several types of bus structures, including a memory bus or memory controller, a peripheral bus, an accelerated graphics port, and a processor or local bus using any of a variety of bus architectures. System memory 504 includes read only memory (ROM) 508 and random access memory (RAM) 510. A basic input/output system 512 (BIOS) is stored in ROM 508.

Computer 500 also has one or more of the following drives: a hard disk drive 514 for reading from and writing to a hard disk, a magnetic disk drive 516 for reading from or writing to a removable magnetic disk 518, and an optical disk drive 520 for reading from or writing to a removable optical disk 522 such as a CD ROM, DVD ROM, or other optical media. Hard disk drive 514, magnetic disk drive 516, and optical disk drive 520 are connected to bus 506 by a hard disk drive interface 524, a magnetic disk drive interface 526, and an optical drive interface 528, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 530, one or more application programs 532, other program modules 534, and program data 536. Application programs 532 or program modules 534 may include, for example, computer program logic for implementing multimodal logic 106, multimodal logic 308, tactile interface 310, determination logic 312, speech understanding logic 314, activation logic 316, monitoring logic 318, identification logic 320, intent logic 322, availability logic 324, response logic 326, textual interface 330, and/or flowchart 200 (including any step of flowchart 200), as described herein.

A user may enter commands and information into the computer 500 through input devices such as keyboard 538 and pointing device 540. Other input devices (not shown) may include a microphone, joystick, game pad, satellite dish, scanner, or the like. These and other input devices are often connected to the processing unit 502 through a serial port interface 542 that is coupled to bus 506, but may be connected by other interfaces, such as a parallel port, game port, or a universal serial bus (USB).

A display device 544 (e.g., a monitor) is also connected to bus 506 via an interface, such as a video adapter 546. In addition to display device 544, computer 500 may include other peripheral output devices (not shown) such as speakers and printers.

Computer 500 is connected to a network 548 (e.g., the Internet) through a network interface or adapter 550, a modem 552, or other means for establishing communications over the network. Modem 552, which may be internal or external, is connected to bus 506 via serial port interface 542.

As used herein, the terms "computer program medium" and "computer-readable medium" are used to generally refer to media such as the hard disk associated with hard disk drive 514, removable magnetic disk 518, removable optical disk 522, as well as other media such as flash memory cards, digital video disks, random access memories (RAMs), read only memories (ROM), and the like. Such computer-readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

As noted above, computer programs and modules (including application programs 532 and other program modules 534) may be stored on the hard disk, magnetic disk, optical disk, ROM, or RAM. Such computer programs may also be received via network interface 550 or serial port interface 542. Such computer programs, when executed or loaded by an application, enable computer 500 to implement features of embodiments discussed herein. Accordingly, such computer programs represent controllers of the computer 500.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

III. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A method comprising:
 determining that a camera of a processing system is pointed at one or more objects or a scene;
 turning on speech understanding functionality of the processing system, using at least one processor of the processing system, in response to determining that the camera is pointed at the one or more objects or the scene, the speech understanding functionality enabling the processing system to understand natural language requests; and
 automatically monitoring audio signals received via an audio interface of the processing system for speech requests from a user of the processing system to be processed using the speech understanding functionality in response to determining that the camera is pointed at the one or more objects or the scene.

2. The method of claim 1, further comprising:
 dynamically identifying one or more entities that correspond to the one or more objects or the scene in an image that is captured by the camera, in response to determining that the camera is pointed at the one or more objects or the scene;
 dynamically identifying a scope of an interaction between the user and the processing system, the scope being associated with the one or more entities, in response to determining that the camera is pointed at the one or more objects or the scene; and
 an understanding of an intent of the user, which is used by the speech understanding functionality to understand the natural language requests, based on the scope.

3. The method of claim 2, further comprising:
 determining a plurality of possible intents that are available to be satisfied with respect to the one or more entities; and
 providing one or more representations of one or more respective possible intents of the plurality of possible intents for the user in response to dynamically identifying the one or more entities and further in response to dynamically identifying the scope.

4. The method of claim 3, wherein providing the one or more representations comprises:
 suggesting one or more exemplary natural language requests for use by the user to request satisfaction of the one or more respective possible intents, each of the one or more exemplary natural language requests capable of being understood by the processing system using the speech understanding functionality.

5. The method of claim 1, wherein automatically-monitoring the audio signals comprises:
 receiving a first speech request from the user, the first speech request indicating a specified intent to be satisfied with respect to one or more entities that correspond to the one or more objects or the scene in an image that is captured by the camera; and
 wherein the method further comprises:
 generating a language response for the user based on the first speech request, the language response pertaining to satisfaction of the specified intent.

6. The method of claim 1, wherein monitoring receiving the audio signals comprises:
 receiving a first speech request from the user, the first speech request indicating a specified intent to be satisfied with respect to one or more entities that correspond to the one or more objects or the scene in an image that is captured by the camera; and
 wherein the method further comprises:
 satisfying the specified intent with respect to the one or more entities; and
 adapting an understanding of an intent of the user, which is used by the speech understanding functionality to understand the natural language requests, based on the specified intent.

7. The method of claim 1, further comprising:
 monitoring a tactile interface of the processing system to detect tactile commands from the user in response to determining that the camera is pointed at the one or more objects or the scene.

8. The method of claim 1, further comprising:
 monitoring textual information received via a textual interface of the processing system for textual commands from the user in response to determining that the camera is pointed at the one or more objects or the scene.

9. A system comprising:
a display configured to display visual content;
a camera configured to capture visual information;
and at least one processor in electronic communication with the display, the camera, and a computer readable storage device storing instructions that when executed cause the processor to:
determine whether one or more entities in the visual content are selected in accordance with a visual command from a user, the visual command identifying the one or more entities in the visual content;
understand natural language requests;
turn on speech understanding functionality in response to a determination that the one or more entities are selected in accordance with the visual command;
receive audio signals;
monitor the visual information for visual commands from the user;
monitor the audio signals for speech requests from the user in response to the determination that the one or more entities are selected; and
process the speech requests.

10. The processing system of claim 9, the instructions further causing the processor to:
dynamically identify the one or more entities and a scope of an interaction between the user and the processing system, the scope being associated with the one or more entities, in response to the determination that the one or more entities are selected; and
adapt an understanding of an intent of the user based on the scope;
wherein the understanding of the intent of the user is used to understand the natural language requests.

11. The processing system of claim 10, the instructions further causing the processor to:
determine a plurality of possible intents that are available to be satisfied with respect to the one or more entities;
wherein the display displays one or more visual representations of one or more respective possible intents of the plurality of possible intents in response to the one or more entities and the scope being dynamically identified.

12. The processing system of claim 11, wherein the one or more visual representations include one or more respective exemplary natural language requests that are suggested for use by the user to request satisfaction of the one or more respective possible intents.

13. The processing system of claim 10, the instructions further causing the processor to:
determine a plurality of possible intents that are available to be satisfied with respect to the one or more entities.

14. The processing system of claim 13, wherein the one or more audio representations include one or more respective exemplary natural language requests that are suggested for use by the user to request satisfaction of the one or more respective possible intents; and
wherein understanding natural language requests comprises understanding each of the one or more exemplary natural language requests.

15. The processing system of claim 9, the instructions further causing the processor to:
satisfy a specified intent with respect to the one or more entities based on receipt of a first speech request from the user, the first speech request indicating that the specified intent is to be satisfied with respect to the one or more entities;
adapt an understanding of an intent of the user based on the specified intent; and
use the understanding of the intent of the user to understand the natural language requests.

16. The processing system of claim 9, wherein the display includes a tactile interface configured to detect contact of an object with the display.

17. The processing system of claim 9, the instructions further causing the processor to:
capture textual information.

18. A computer-readable storage device storing instructions that, when executed, perform a method, the method comprising:
determining that a camera of a processing system is pointed at one or more objects or a scene;
turning on speech understanding functionality of the processing system, using at least one processor of the processing system, in response to determining that the camera is pointed at the one or more objects or the scene, the speech understanding functionality enabling the processing system to understand natural language requests; and
automatically monitoring audio signals received via an audio interface of the processing system for speech requests from a user of the processing system to be processed using the speech understanding functionality in response to determining that the camera is pointed at the one or more objects or the scene.

19. The computer-readable storage device of claim 18, the method further comprising:
dynamically identifying one or more entities that correspond to the one or more objects or the scene in an image that is captured by the camera, in response to determining that the camera is pointed at the one or more objects or the scene;
dynamically identifying a scope of an interaction between the user and the processing system, the scope being associated with the one or more entities, in response to determining that the camera is pointed at the one or more objects or the scene; and
adapting an understanding of an intent of the user, which is used by the speech understanding functionality to understand the natural language requests, based on the scope.

20. The computer-readable storage device of claim 19, the method further comprising:
determining a plurality of possible intents that are available to be satisfied with respect to the one or more entities; and
providing one or more representations of one or more respective possible intents of the plurality of possible intents for the user in response to dynamically identifying the one or more entities and further in response to dynamically identifying the scope.

* * * * *